Figure 1:
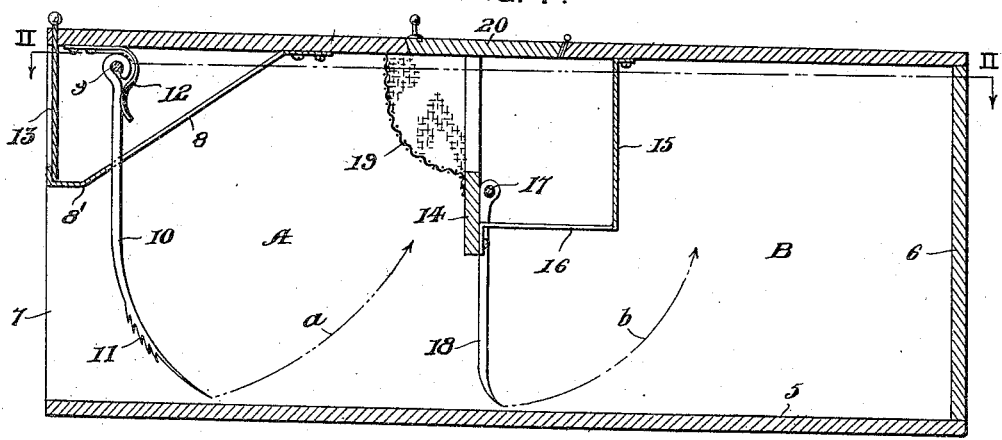

A. SKUBINSKI.
ANIMAL TRAP.
APPLICATION FILED JULY 28, 1920.

1,422,894.   Patented July 18, 1922.

Inventor
A. Skubinski
By N. M. Wilson
Attorney

UNITED STATES PATENT OFFICE.

ALEKSANDER SKUBINSKI, OF LOS ANGELES, CALIFORNIA.

ANIMAL TRAP.

1,422,894. Specification of Letters Patent. Patented July 18, 1922.

Application filed July 28, 1920. Serial No. 399,566.

*To all whom it may concern:*

Be it known that I, ALEKSANDER SKUBINSKI, a citizen of Poland, residing at Los Angeles, in the county of Los Angeles and State of California, have invented certain new and useful Improvements in Animal Traps, of which the following is a specification.

This invention relates to certain new and useful improvements in animal traps and is particularly serviceable in forming a cage trap for mice and rats.

The primary object of the present invention is to provide a trap of the above kind which is extremely simple and durable in construction as well as efficient in operation and capable of being readily placed in use.

A further object is to provide an animal trap in the form of a box or casing with an opening at one end and pivoted members adjacent the opening which may be resiliently swung inwardly sufficiently to allow the entrance of a mouse or the like, but limited in outward movement so as to effectively prevent exit of the mouse.

Further objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views.

Figure 2:
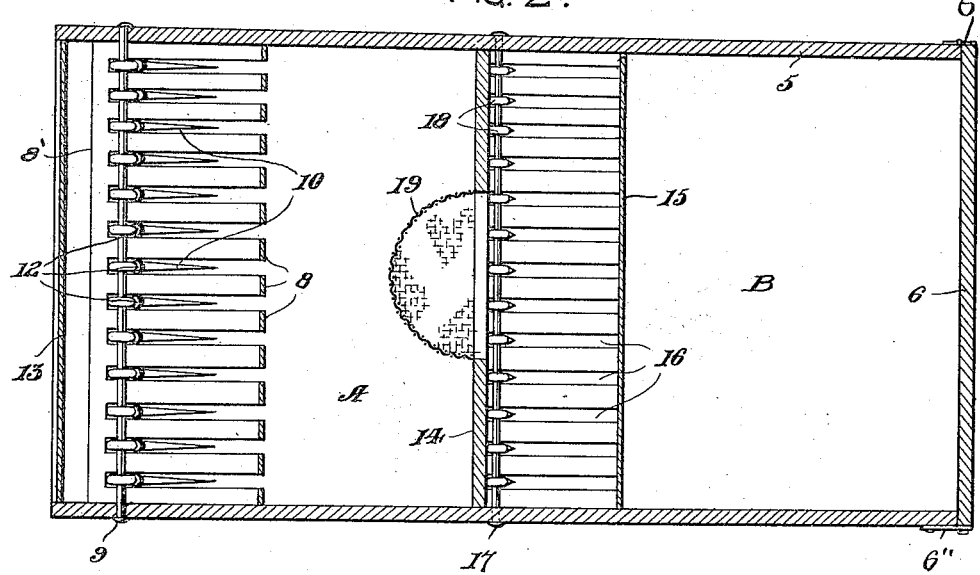
Figure 3:
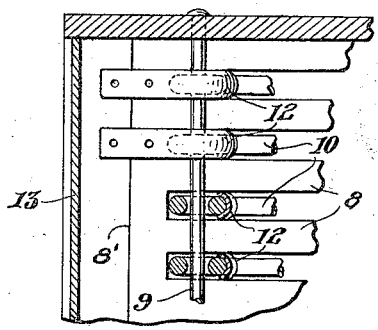

Figure 1 is a substantially central longitudinal sectional view of a trap constructed in accordance with the present invention, Figure 2 is a horizontal sectional view thereof taken substantially upon line II—II of Fig. 1, and Figure 3 is an enlarged fragmentary horizontal sectional view of the device shown in Fig. 1 showing details of the mounting for the pivoted members.

Referring more in detail to the several views, the present invention embodies a box or casing 5 of substantially rectangular form and preferably elongated as clearly seen in Figs. 1 and 2, said box being provided with a rear door 6 hinged at 6' and provided with a locking means 6" and being opened for a portion of its height to provide a front entrance opening 7. A suitable slotted metal frame 8 is secured to the inner side of the top wall of the box 5 adjacent the entrance opening 7, and a rod 9 is supported by the side walls of the box above the frame 8 transversely of said box. A plurality of members 10 are pivotally mounted upon the rod 9 and each depend to a point adjacent the bottom of the box through one slot of the frame 8 so that said members 10 are retained by the frame in proper spaced relation, the forward walls of the slots of the frame 8 being so positioned as to limit the outward swinging movements of the members 10 to a substantially vertical position as shown in Fig. 1. The lower ends of the members 10 are inwardly curved so as to permit ready entrance of a mouse, but the forward sides of the lower ends of the members 10 are toothed as at 11 to dig into the mouse should he attempt to back out of the receptacle before fully therein. A suitable leaf spring 12 is associated with each member 10 for normally yieldingly holding the same in its vertical operative position, and a removable front panel 13 is provided above the entrance opening 7 for permitting access to the rod 9 and springs 12 above the frame 8 for repair or other purposes. The panel 13 is supported at its lower end on the angularly bent outer end 8' of the plate 8.

A short wall 14 depends from the top of the box 5 substantially centrally of the latter and transversely of the same so as to divide the box into a forward chamber A and a rear chamber B. Another frame 15 is supported by the wall 14 and the top of the box 5 rearwardly of said wall, and the frame 15 is also longitudinally slotted as at 16. Another rod 17 is arranged transversely of the box rearwardly of the wall 14, and another set of swinging members 18 is pivoted upon the rod 17 so that each member 18 depends through a slot of the frame 15 whereby the members 18 are maintained properly spaced. The lower ends of the members 18 are also inwardly curved at their lower ends, and these members are limited in outward swinging movement to a substantially vertical position by means of the wall 14.

In order to entice mice to the trap, a suitable foraminous receptacle 19 is supported within the box 5 above the members 18 and in front of the wall 14 for receiving a suitable bait. A closure 20 is provided in the top wall of the box 5 which may be opened for permitting the bait to be deposited in the receptacle 19 from time to time when found desirable.

In the operation of the device, the parts are normally positioned as shown in Fig. 1, and a mouse desiring to get at the bait within the receptacle 19 will press against the members 10 and swing the same upwardly in the direction of the arrow $a$. When the members 10 are thus swung upwardly, the same will interfere with the mouse reaching the receptacle 19, and the mouse will then press upon the members 18 for swinging the latter rearwardly and upwardly in the direction of the arrow $b$. As soon as the mouse gets beyond the members 18, the latter will immediately swing to vertical position so that the mouse is trapped and cannot escape. The mouse may be removed from the trap by simply opening the door 6.

It is believed that the construction and operation as well as the advantages of the present invention will be readily understood and appreciated by those skilled in the art.

Minor changes may be made without departing from the spirit and scope of the invention as claimed.

What is claimed as new is:—

1. A trap of the class described including a box-like casing having a rear door and a front entrance opening, a partition for dividing the box into a plurality of compartments, closing means for the main compartment, comprising a plurality of pivotally mounted spring pressed fingers curved at the lower ends and provided with a series of teeth to prevent backward movement of the animal.

2. A trap of the class described including a box-like casing having a rear door and a front entrance opening, a partition for dividing the box into a plurality of compartments, closing means for the main compartment comprising a plurality of pivotally mounted spring pressed fingers, guide means for said fingers consisting of a sheet metal plate having a series of slots cut therein, said fingers swinging within said slots, the outer end of the sheet metal plate being angularly bent, a sliding door carried by the casing controlling access to the pivotal mounting of the said fingers and supported at its lower end on the angularly bent end of said plate.

3. A trap of the class described including a box-like casing having a rear door and a front entrance opening, a partition for dividing the box into a main and secondary compartment, independently operating closing means for each compartment consisting of a cross rod pivotally supporting a series of fingers thereon, the closing means for each compartment being so disposed with relation to each other as to necessitate a partial opening of the secondary closing means before the closing means of the main compartment will be allowed to swing to a closed position.

In testimony whereof I affix my signature.

ALEKSANDER SKUBINSKI.